US012613946B2

(12) United States Patent
Atkinson et al.

(10) Patent No.: US 12,613,946 B2
(45) Date of Patent: Apr. 28, 2026

(54) VIEWER AUTHORIZATION FOR DISPLAY PANELS

(71) Applicant: Hewlett-Packard Development Company, L.P., Spring, TX (US)

(72) Inventors: Lee Warren Atkinson, Taipei City (TW); Yi-Chen Chen, Taipei City (TW); Chen-Fang Hsu, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 362 days.

(21) Appl. No.: 18/005,834

(22) PCT Filed: Aug. 6, 2020

(86) PCT No.: PCT/US2020/045199
§ 371 (c)(1),
(2) Date: Jan. 17, 2023

(87) PCT Pub. No.: WO2022/031286
PCT Pub. Date: Feb. 10, 2022

(65) Prior Publication Data
US 2023/0281285 A1      Sep. 7, 2023

(51) Int. Cl.
| G06V 40/20 | (2022.01) |
| G06F 21/32 | (2013.01) |
| G06F 21/60 | (2013.01) |
| G06F 21/84 | (2013.01) |
| G06V 40/10 | (2022.01) |

(52) U.S. Cl.
CPC ............ *G06F 21/32* (2013.01); *G06F 21/604* (2013.01); *G06F 21/84* (2013.01); *G06V 40/10* (2022.01); *G06V 40/20* (2022.01)

(58) Field of Classification Search
CPC ........ G06F 3/013; G06F 1/1626; G06F 3/017; G06F 21/32; G06F 21/604; G06F 21/84; G06F 3/0482; G06F 1/1694; G06V 40/10; G06V 40/20
See application file for complete search history.

(56) References Cited

U.S. PATENT DOCUMENTS

| 8,788,977 | B2 * | 7/2014 | Bezos | ..................... | G06F 3/013 |
| | | | | | 715/773 |
| 10,599,877 | B2 * | 3/2020 | Lam | .................... | G06F 21/6245 |
| 11,615,663 | B1 * | 3/2023 | Chinoy | .................... | G07C 9/37 |
| | | | | | 348/156 |

(Continued)

FOREIGN PATENT DOCUMENTS

| CN | 107636521 A | * | 1/2018 | ........... | G02F 1/1334 |
| WO | 2014/043620 A1 | | 3/2014 | | |

*Primary Examiner* — Shaghayegh Azima

(74) *Attorney, Agent, or Firm* — Quarles & Brady LLP

(57) ABSTRACT

Example electronic devices are disclosed. In some examples, the electronic device includes a display panel, an image sensor, and a controller coupled to the image sensor. The controller is to use the image sensor to detect an interaction between a first viewer of the display panel and a second viewer of the display panel. In addition, the controller is to determine whether the second viewer is authorized to view information presented on the display panel based on the interaction. Further, the controller is to adjust a presentation of the information on the display panel based on the determination.

20 Claims, 8 Drawing Sheets

(56)  References Cited

U.S. PATENT DOCUMENTS

| | | | |
|---|---|---|---|
| 2010/0124363 A1* | 5/2010 | Ek | G06F 21/32 |
| | | | 382/118 |
| 2013/0254874 A1* | 9/2013 | Xu | G06F 21/84 |
| | | | 726/17 |
| 2014/0344334 A1* | 11/2014 | Trachtenberg | G06Q 30/0603 |
| | | | 709/203 |
| 2015/0113666 A1* | 4/2015 | Buck | G09G 3/20 |
| | | | 726/28 |
| 2015/0116212 A1* | 4/2015 | Freed | G06F 21/6245 |
| | | | 345/156 |
| 2016/0224106 A1* | 8/2016 | Liu | G06F 3/013 |
| 2017/0116425 A1* | 4/2017 | Chang | G06V 40/172 |
| 2019/0384941 A1* | 12/2019 | Anderson | G06F 21/32 |
| 2020/0089851 A1* | 3/2020 | Kumar Agrawal | G06V 20/52 |
| 2022/0263836 A1* | 8/2022 | Halun | G06F 3/04883 |

* cited by examiner

Use the image sensor 60 to detect an interaction between a first viewer 50 and a second viewer 52 of the display panel 18. — 102

Determine whether the second viewer 52 is authorized to view the information 40 presented on the display panel 18 based on the interaction. — 104

Adjust a presentation of the information 40 on the display panel 18 based on the determination. — 106

74

100

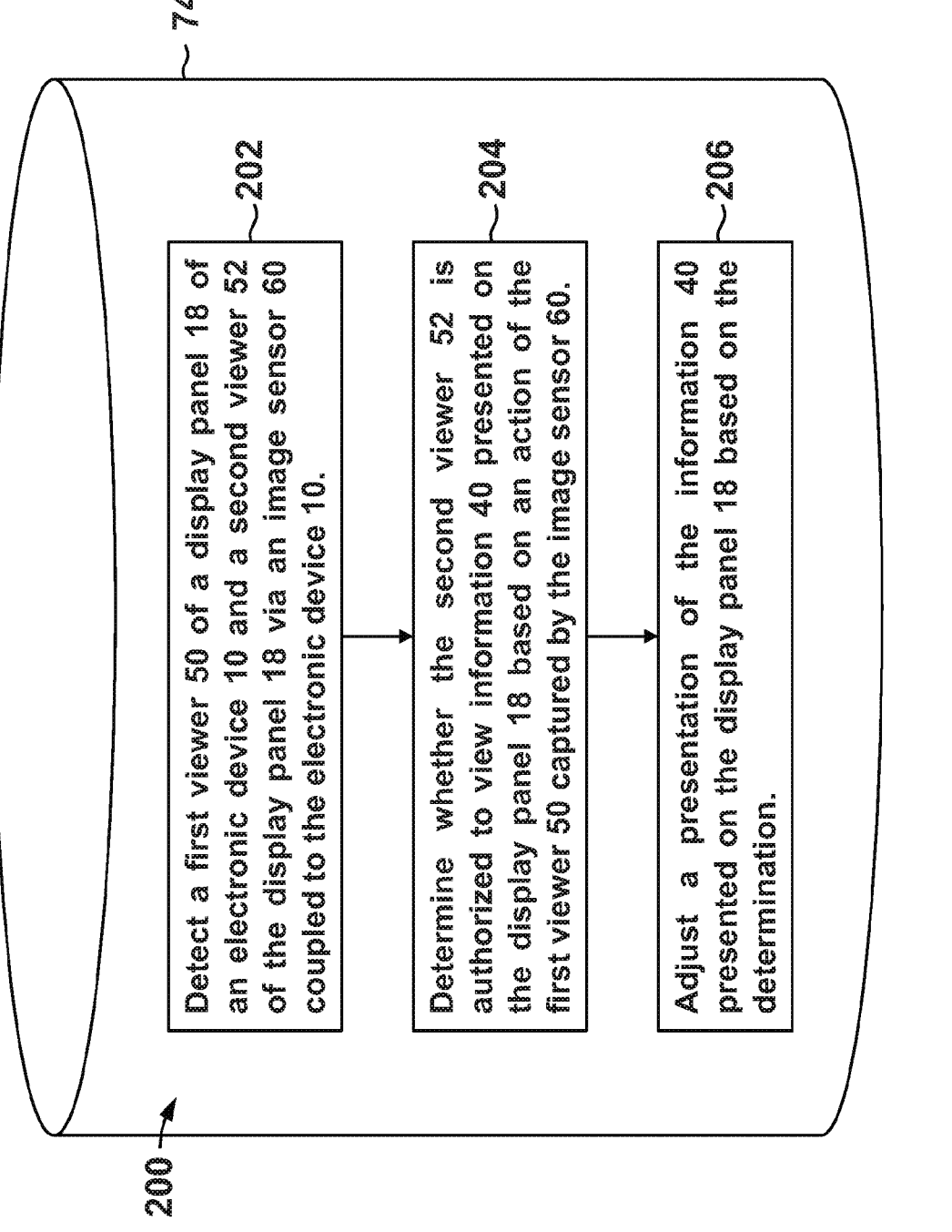

74

200

Detect a first viewer 50 of a display panel 18 of an electronic device 10 and a second viewer 52 of the display panel 18 via an image sensor 60 coupled to the electronic device 10.

202

Determine whether the second viewer 52 is authorized to view information 40 presented on the display panel 18 based on an action of the first viewer 50 captured by the image sensor 60.

204

Adjust a presentation of the information 40 presented on the display panel 18 based on the determination.

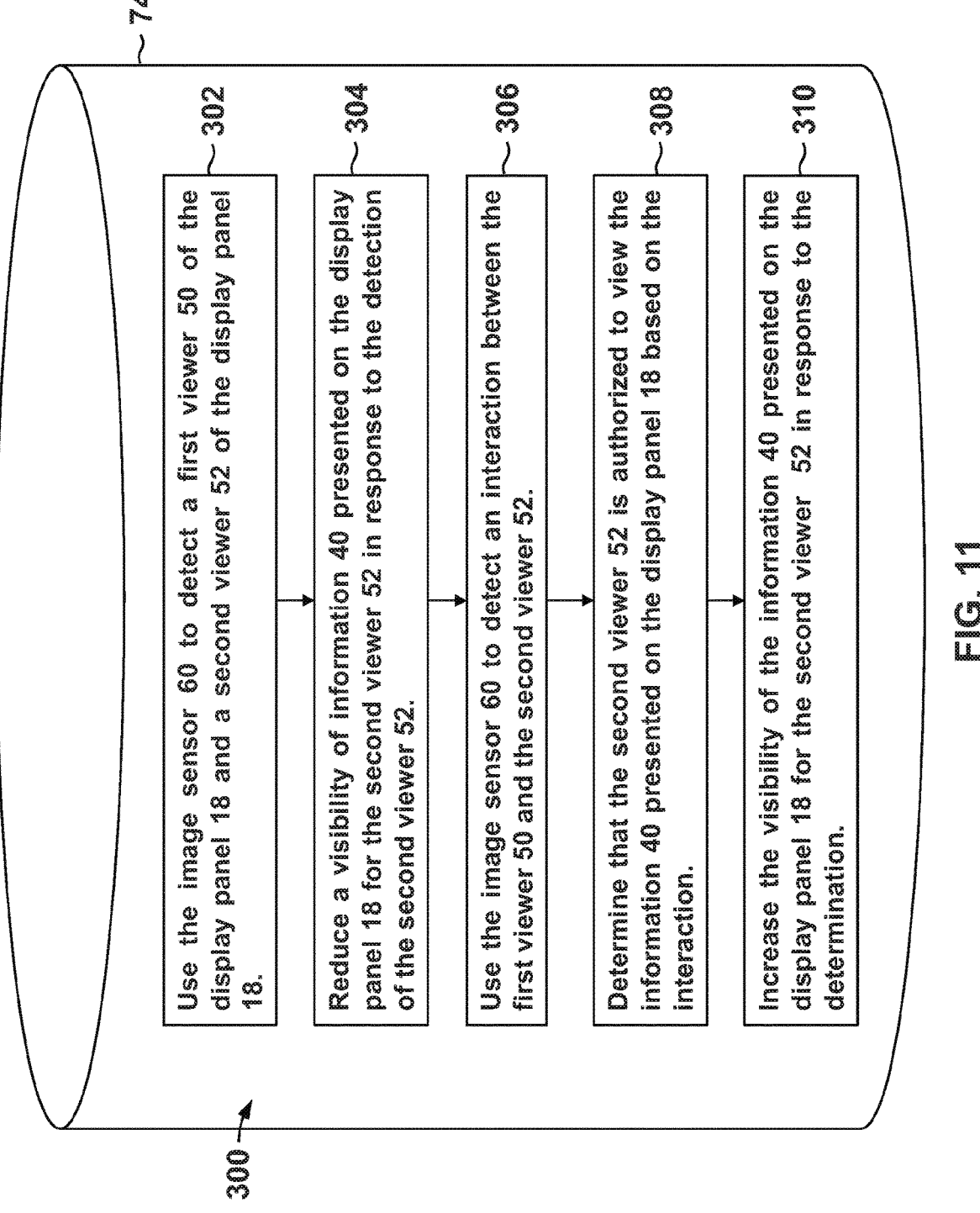

74

300

Use the image sensor 60 to detect a first viewer 50 of the display panel 18 and a second viewer 52 of the display panel 18.

302

Reduce a visibility of information 40 presented on the display panel 18 for the second viewer 52 in response to the detection of the second viewer 52.

304

Use the image sensor 60 to detect an interaction between the first viewer 50 and the second viewer 52.

306

Determine that the second viewer 52 is authorized to view the information 40 presented on the display panel 18 based on the interaction.

308

Increase the visibility of the information 40 presented on the display panel 18 for the second viewer 52 in response to the determination.

VIEWER AUTHORIZATION FOR DISPLAY PANELS

BACKGROUND

Electronic display panels (or, more simply, "display panels") are used in a variety of different ways and in a variety of different types of devices. For example, such display panels are used in televisions, computer monitors, laptop computers, tablet computers, all-in-one computers, smartphones, etc. The images and/or information presented on a display panel may include, for example, data, documents, textual information, communications, motion pictures, still images, etc., all of which may be collectively referred to herein as "information."

BRIEF DESCRIPTION OF THE DRAWINGS

Various examples will be described below referring to the following figures:

FIGS. 9-11 show flow diagrams of example machine-readable instructions for determining whether a second viewer of a display panel is authorized to view information presented on the display panel according to some examples.

DETAILED DESCRIPTION

As previously described, display panels present information to a viewer or plurality of viewers. Display panels may present information that is considered confidential or sensitive. Thus, an authorized "first viewer" of the display panel may generally wish to limit others' visibility of such information on the display panel. In some circumstances, particularly with respect to display panels of mobile electronic devices (e.g., smartphones, laptop computers, tablet computers, etc.), other individuals who are not authorized to view the information presented on the display panel may nevertheless see such information over the shoulder of the first viewer of the display panel. This may be referred to as "shoulder surfing." As a result, an electronic device may actively monitor an environment surrounding the first viewer (particularly the environment behind the first viewer) for additional, unauthorized viewers, and upon the detection thereof, take some remedial action (e.g., alerting the first viewer, blurring or blacking out the display panel, etc.).

However, in some circumstances, the first viewer may intend for additional viewers to view the confidential information presented on the display panel (e.g., such as for a collaborative work project, or when the additional viewer has a close personal relationship with the first viewer, etc.). In these circumstances, an electronic device may incorrectly presume that a second viewer is an unauthorized viewer and thereby take remedial actions that may prevent or at least frustrate the collaborative viewing activity that is intended by the first viewer.

Accordingly, the examples disclosed herein include electronic devices (and/or components thereof) that may actively monitor an environment surrounding a first viewer of a display panel (or portion thereof). Upon detecting a second viewer, monitor for additional interaction between the first viewer and second viewer and/or action of the first viewer and/or second viewer that might indicate that the second viewer is an authorized viewer of the information presented on the display panel. Thereafter, the electronic device may take some action based on the determination as to whether the second viewer is authorized (e.g., to protect the information presented on the display panel or to enhance a visibility thereof). Thus, through use of the example electronic devices disclosed herein, privacy of information presented on a display panel may be preserved while allowing for collaborative viewing of the information when desired.

Figure 1:
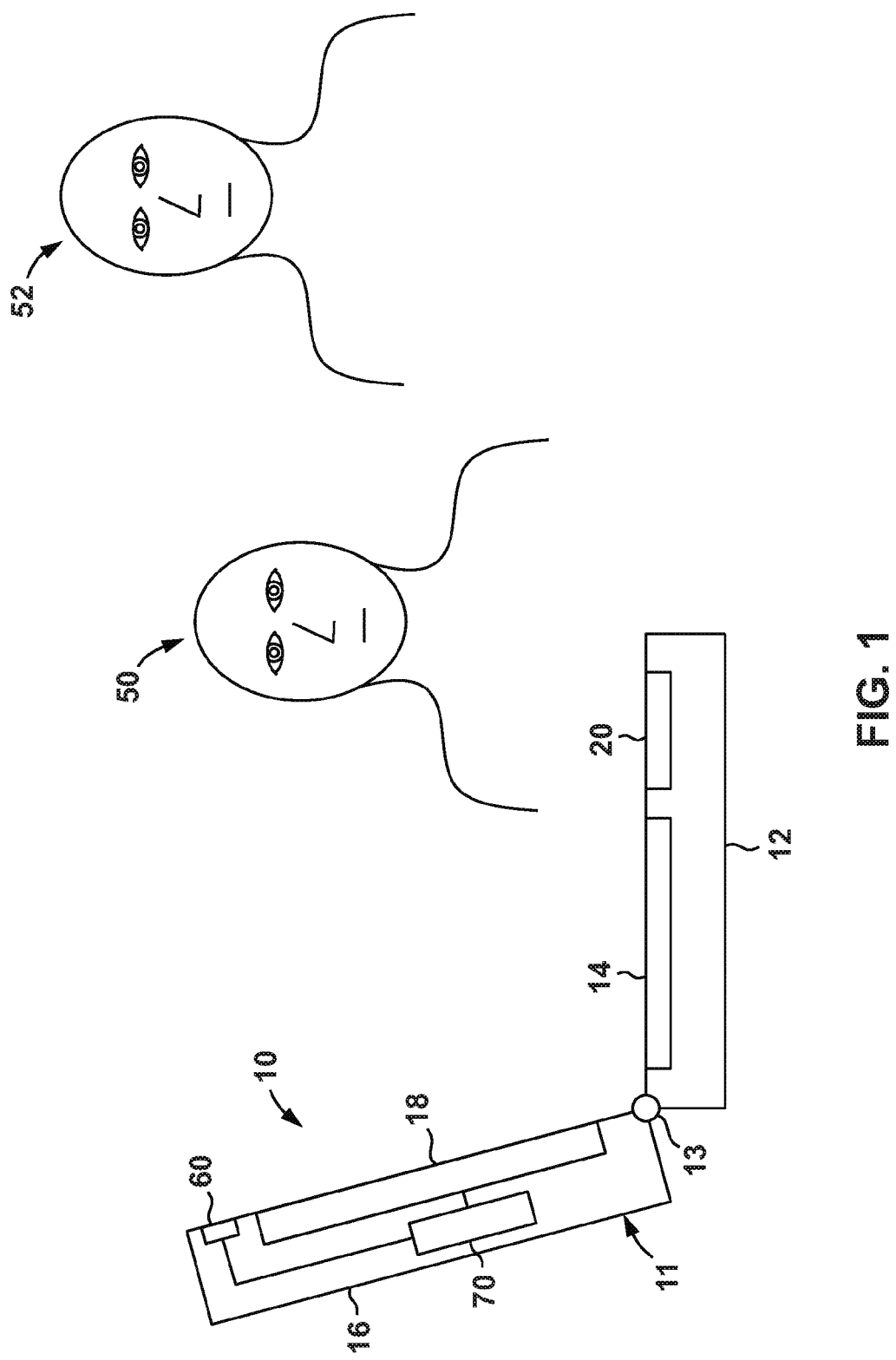
FIG. 1 shows a schematic side view of an electronic device according to some examples.

Referring now to FIG. 1, an electronic device 10 according to some examples is shown. As used herein, the term "electronic device" refers to a device or assembly that includes component such as processors (e.g., to execute machine-readable instructions), power supplies, memory, etc. For example, an electronic device may include a personal computer, a smart phone, a tablet computer, a laptop computer, etc. In the example of FIG. 1, electronic device 10 is a laptop computer that includes a housing 11 comprising a first housing member 12 and a second housing member 16 rotatably coupled to one another at a hinge 13. The first housing member 12 includes a plurality of user input devices, such as, for example, a keyboard 14 and a trackpad 20.

The second housing member 16 includes a display panel 18 that is to display information (not shown). As used herein, the term "display panel" refers to an electronic display panel that is to display information generated by an associated electronic device. Examples of display panels include a liquid crystal display (LCD) panel, a plasma display panel, an organic light emitted diode (OLED) display panel, etc.

Second housing member 16 also includes an image sensor 60. Image sensor 60 may comprise any suitable sensor or sensor array that is to detect images in or outside the visible light spectrum (e.g., infrared, ultraviolet, etc.). In some examples, image sensor 60 comprises a camera (e.g., a video camera). During operations, image sensor 60 is to capture images of a viewer or plurality of viewers (see e.g., viewers 50, 52) of the display panel 18. In some examples (e.g., such as the example of FIG. 1), the image sensor 60 is positioned along a top most side of the display panel 18. However, the precise location of image sensor 60 may be varied in different examples.

A controller 70 is positioned within housing 11 and is coupled to image sensor 60 and display panel 18. Controller 70 may be positioned within first housing member 12 or second housing member 16 in various examples; however, in the example of FIG. 1, controller 70 is positioned within second housing member 16. In some examples, controller 70 may be distributed among first housing member 12 and second housing member 16, such that a first portion of controller 70 is positioned within first housing member 12 and a second portion of controller 70 is positioned within second housing member 16. The operation of the electronic device 10 of FIG. 1 is described below following a description of FIG. 2.

Figure 2:
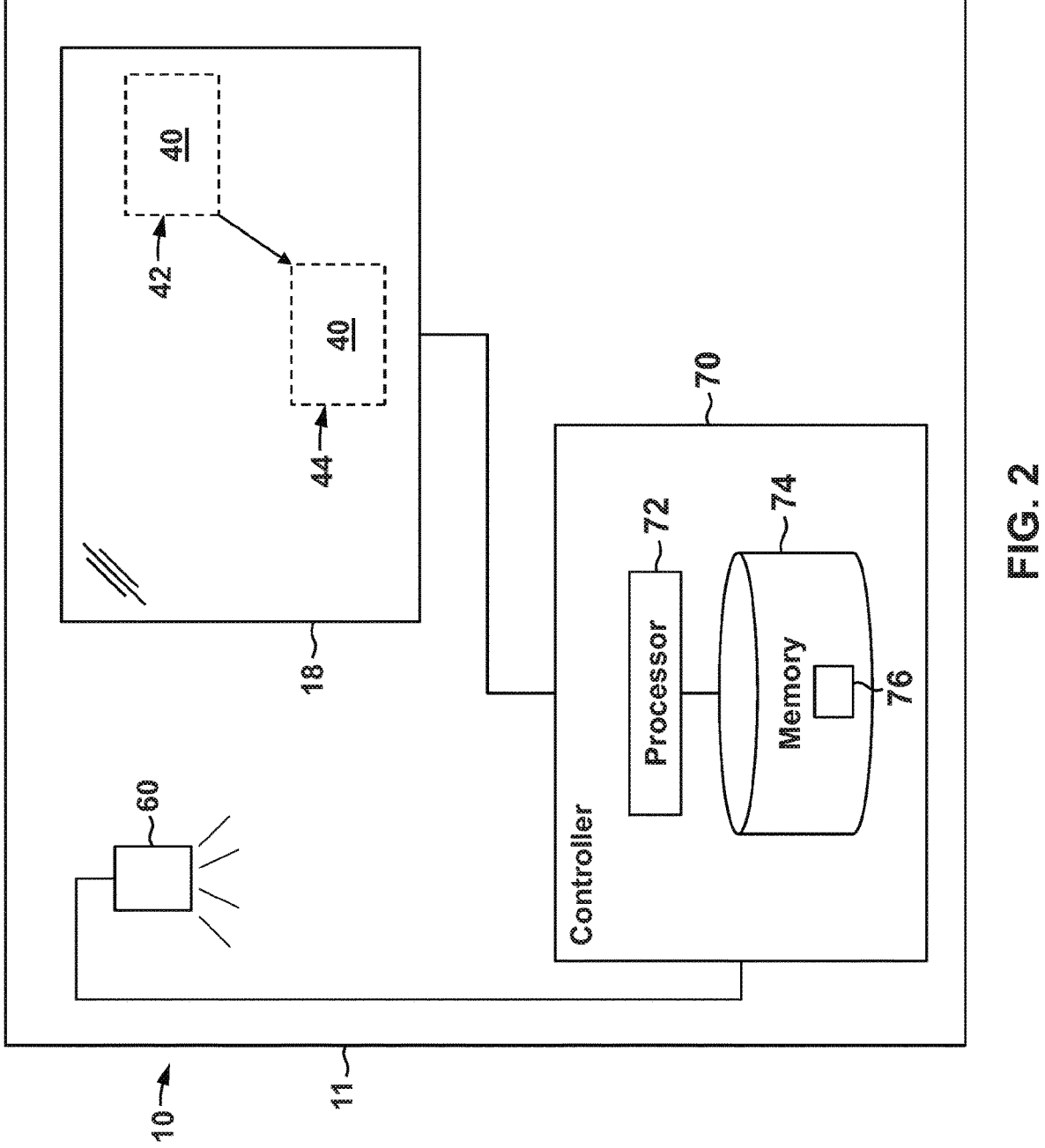
FIG. 2 shows a schematic system diagram of a controller, an image sensor, and a display panel of an electronic device according to some examples.

Reference is now generally made to FIG. 2, which shows a schematic system diagram of electronic device 10 (with a limited, schematic depiction of display panel 18, image sensor 60, and controller 70). As shown, controller 70 generally includes a processor 72 and a memory 74. The processor 72 (e.g., microprocessor) executes machine-readable instructions 76 stored on memory 74 (e.g., a non-transitory machine-readable medium), thereby causing the processor 72 (and, more generally, the controller 70) to perform some or all of the actions attributed herein to the processor 72 (and, more generally, to the controller 70). The memory 74 may comprise volatile storage (e.g., random access memory (RAM)), non-volatile storage (e.g., flash storage, etc.), or combinations of both volatile and non-volatile storage. Data read or written by the processor 72 when executing the machine-readable instructions 76 can also be stored on memory 74. In addition, images captured by the image sensor 60 may also be saved on memory 74.

Referring now to FIGS. 1 and 2, as previously described, in some circumstances, a first viewer 50 of the display panel 18 may be viewing information 40 presented on the display panel 18 that is considered confidential or sensitive. In some examples, the controller 70 may automatically determine that the information 40 may be classified as "confidential." For instance, the controller 70 may assess whether certain key words appear in the information 40 (e.g., "hospital," "social security," "financial," "bank," "account," "password," etc.) that might indicate that the information 40 may be classified as "confidential." In some examples, the information 40 may be displayed on a website via a web-browser application. In these instances, the controller 70 may determine whether the information 40 is confidential based on the associated website, itself. For example, websites associated with banks, medical providers, employers, insurance, etc. may be assumed to contain information of a confidential nature so that the information displayed on these sites may be automatically classified by controller 70 as "confidential." In some examples, controller 70 may detect whether images presented on the display panel 18 include confidential or sensitive content. For instance, controller 70 may be trained (e.g., via a machine-learning training method) to recognize certain images as sensitive, such that when an image is presented on display panel 18, controller 70 may recognize via the rules established during the training that the image includes sensitive or confidential content (and therefore should be classified as "confidential").

In some examples, the first viewer may designate that the information 40 is confidential. For instance, the first viewer may (e.g., via appropriate menu selection) designate that information presented in a particular application (e.g., such as a web browser application, word processing application, etc.) is to be designated as "confidential." In some examples, a user may designate that all information (e.g., information 40) presented on the display panel 18 is to be considered "confidential." In some examples, the controller 70 may, automatically consider all information (e.g., information 40) presented on the display panel 18 to be "confidential."

Regardless as to whether the controller 70 automatically determines that the information 40 is confidential, the controller 70 may use the image sensor 60 to detect the presence of the first viewer 50. In some examples, the first viewer 50 is determined to be an individual that is positioned closest to the display panel 18 and/or centered relative to the display panel 18. In some examples, the controller 70 may interrogate a time-of-flight or other suitable proximity sensor (not shown) either alone or in combination with the image(s) captured by the image sensor 60 to determine the proximity to the first viewer 50.

In addition, controller 70 may also detect a second viewer 52 of the display panel 18 using the image sensor 60. The second viewer 52 may be an unauthorized viewer of the information 40 presented on the display panel 18. However, it is also possible that the first viewer 50 approves or even desires that the second viewer 52 view the information 40 presented on display panel 18. Thus, upon detecting the second viewer 52, the controller 70 may determine (e.g., via the machine-readable instructions 76 stored on memory 74) whether the second viewer 52 is authorized to view the information 40 presented on the display panel 18 based on an interaction between the first viewer 50 and second viewer 52 and/or actions of the first viewer 50 or second viewer 52. The interaction between the first viewer 50 and second viewer 52 and/or the actions of the first viewer 50 and second viewer 52 may, in some examples, be detected using the image sensor 60.

If the controller 70 determines that the second viewer 52 is not authorized to view the information 40, the controller 70 may take one or a plurality of actions to protect the information 40. In some examples, controller 70 may reduce a visibility of the information 40. As used herein, the phrases "reduce a visibility" and "increase a visibility" (and the like) refer to reducing and increasing, respectively, an individual's ability to visually discern information presented on a display panel (e.g., such as information 40 presented on display panel 18). For instance, upon determining that the second viewer 52 is not authorized to review the information 40, controller 70 may cause the display panel 18 to blur or occlude (e.g., redact) the information 40 (or the entire display panel 18). The controller 70 may reduce a size (e.g., a text size) of the information 40. In some examples, controller 70 may change a location of the information 40 on the display panel 18 from a first region 42 to a second region 44. The second region 44 may comprise a portion of the display panel 18 that is occluded from the view of the second viewer 52. Specifically, in some instances, the second region 44 may be centered along the lower edge of the display panel 18, such that the information 40 is now obstructed by the body (e.g., head, shoulders, etc.) of the first viewer 50 from the viewpoint of the second viewer 52 (which may be behind and off-center from the display panel 18). In some examples, the controller 70 may present a message on the display panel 18 warning the first viewer 50 about the presence of the second viewer 52. The controller 70 may also or alternatively present an image (e.g., still image, video, etc.) on the display panel 18 of the second viewer 52 that is captured by the image sensor 60. Controller 70 may perform one or a combination (including all) of these actions upon determining that the second viewer 52 is not authorized to view the information 40.

By contrast, if the controller 70 determines that the second viewer 52 is authorized to view the information 40, the controller 70 may, in some circumstances, increase a visibility of the information 40. For instance, controller 70 may increase a size of the information 40 (e.g., a text size). In addition, the controller 70 may move the information 40 to a location on the display panel 18 that is more easily viewable by the second viewer 52. In some circumstances, the controller 70 may take no specific action in response to determining that the second viewer 52 is authorized to view the information 40.

Figure 3:
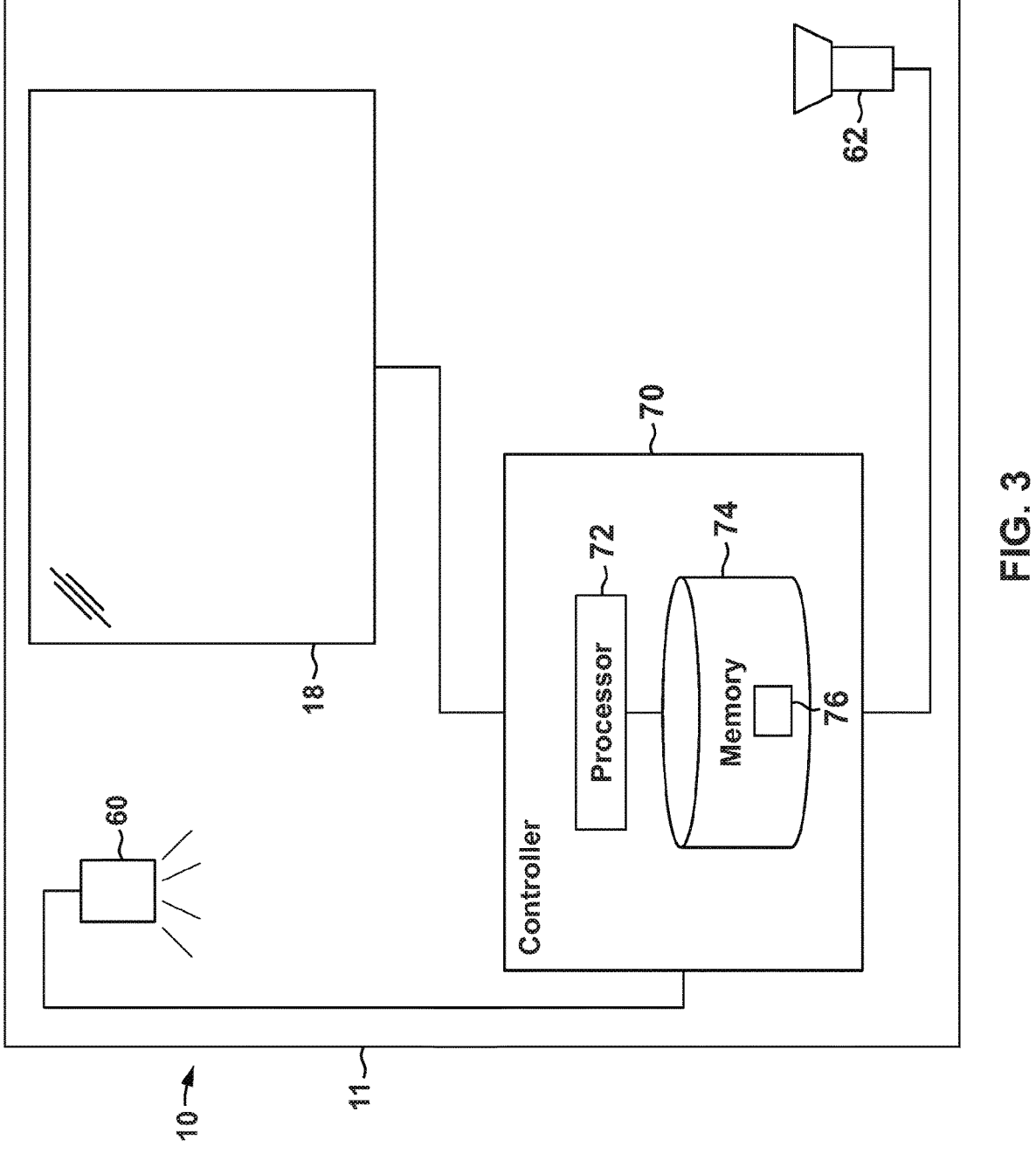
FIG. 3 shows a schematic system diagram of a controller, an image sensor, a display panel, and a microphone of an electronic device according to some examples.

Referring briefly to FIGS. 1 and 3, in some examples, electronic device 10 may include a microphone 62 within the housing 11 (e.g., within either the first housing member 12 or the second housing member 16). Microphone 62 may comprise a single microphone or a microphone array. Regardless, during operations, microphone 62 is to receive sound waves and convert them into electrical signals for subsequent communication and processing as described herein. In some examples, microphone 62 may be utilized by the electronic device 10 to record sounds associated with videos, voice memos, other sound recordings, etc. In some examples, microphone 62 may comprise a tunable microphone 62 that may have an adjustable detection range or direction. Specifically, microphone 62 may be more sensitive to sound waves emitted within the detection range or direction during operations. In some examples, upon determining that the second viewer 52 is authorized or not authorized to view the information 40 on display panel 18, the controller 70 (e.g., in addition or in lieu of the other actions described above), may adjust the detection range or direction of microphone 62 based on the determination. For instance, if the second viewer 52 is determined to be authorized to view the information 40, the controller 70 may adjust the detection range and/or direction of microphone 62 so as to encompass the area occupied by the second viewer 52 (e.g., so that microphone 62 is able to properly detect sound inputs provided by the second viewer 52 such as for voice-based commands or for voice and/or video conferencing utilizing the electronic device 10). If, on the other hand, the second viewer 52 is determined to not be authorized to view the information 40, the controller 70 may adjust the detection range and/or direction so as to ignore or block out the area occupied by the second viewer 52.

In some examples, controller 70 may condition the protection of the information 40 (and thus the analysis of whether the second viewer 52 is authorized to view the information 40) based on the location in which the electronic device 10 is being operated. In public locations, unwanted shoulder surfing may be more likely, so that heightened security protocols are useful. For instance, if electronic device 10 is being operated in a private location, such as, the first viewer's 50 home, office, etc., controller 70 may determine that any detected second viewers 52 are likely authorized to view the information 40 presented on display panel 18, and thereby avoid any reductions in the visibility of the information 40 during operations. By contrast, if electronic device 10 is being operated in a public location, such as a coffee shop, park, airport, etc., controller 70 may apply a heightened security protocol and thus engage in determining the authorization of detected second viewers to view the information 40 as described herein.

In some instances, the controller 70 may receive information regarding the location of operation for the electronic device 10 from the first viewer 50 directly (e.g., via menu input or other suitable input method). In other instances, the controller 70 may automatically assess the location of electronic device 10 and apply the corresponding security protocol in response to the assessment. For example, controller 70 may access location data from a global positioning system (GPS). In some instances, controller 70 may determine the location of electronic device 10 based on information obtained from available wireless networks (e.g., WiFi, cellular networks, etc.). In some instances, if the controller 70 detects relatively high noise levels via the microphone 62 (e.g., above a threshold sound pressure level), the controller 70 may determine that the electronic device 10 is most likely located in a public place (and therefore a heightened security protocol may be applied). Likewise, if the controller 70 detects a large number of additional individuals (e.g., second viewers 52) via the image sensor 60, the controller 70 may again determine that the electronic device 10 is being operated in a public location such that a heightened security protocol should be applied.

Further details of controller 70 and the methods utilized thereby to determine whether the second viewer 52 is authorized to view the information 40 on the display panel 18 are now described in more detail below. In describing these techniques, continuing reference will be made to the schematic depiction of electronic device 10 in FIG. 2, so as to provide clarity.

Specifically, as previously described above, the controller 70 may determine whether a second viewer 52 of display panel 18 is authorized to view information 40 presented thereon based on an interaction between the first viewer 50 and second viewer 52 and/or actions of the first viewer 50 and/or second viewer 52. Interactions between two individuals often provide a multitude of clues as to the disposition of the two individuals toward one another. For instance, an unauthorized second viewer 52 of confidential information 40 may wish to avoid detection by the first viewer 50 so that the second viewer 52 may continue to view the confidential information 40. As a result, interactions between and/or actions of the first and second viewers 50, 52 that indicate open and friendly interaction and exchange between the viewers 50, 52 may cause controller 70 to determine that the second viewer 52 is authorized to view the information 40. Conversely, interactions between and/or actions of the first and second viewers 50, 52 that indicate a lack of open exchange therebetween or evasive (or elusive) behavior of the second viewer 52 may cause controller 70 to determine that the second viewer 52 is not authorized to view the information 40. Accordingly, the controller 70 may look for certain actions and interactions of the viewers 50, 52, captured by the image sensor 60 during operations, in order to make a determination as to whether the second viewer 52 is authorized (e.g., at least implicitly) to view the information 40 presented on display panel 18.

Figures 4, 5:
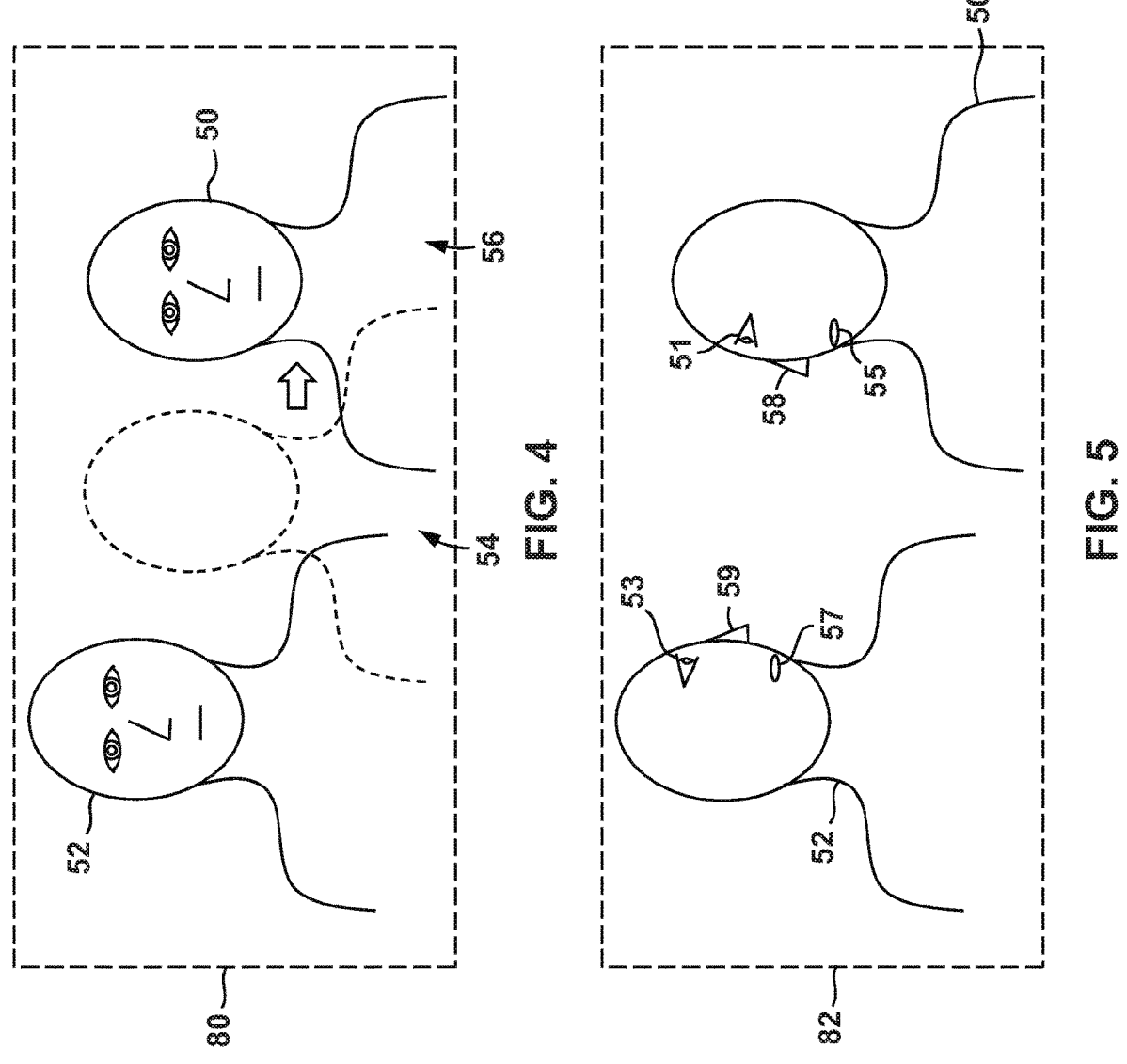
FIGS. 4-8 show schematic representations of images that may be captured by an image sensor of an electronic device according to some examples.

For instance, referring now to FIGS. 2 and 4, in some examples, controller 70 may capture an image 80 (which may comprise a series of images) with the image sensor 60 showing that the first viewer 50 physically shifts in position, such as from a first position 54 to a second position 56 relative to the display panel 18 so as to clear a view of the display panel 18 for the second viewer 52. Without being limited to this or any other theory, the movement of the first viewer 50 to clear a view of the display panel 18 for the second viewer 52 may indicate that the first viewer 50 approves and may even desire that the second viewer 52 view the information 40 presented on the display panel 18. Thus, upon detecting the shift in position (e.g., from position 54 to position 56) of the first viewer 50 following the detection of the second viewer 52 via the image sensor 60, the controller 70 may determine that the second viewer 52 is authorized to view the information 40 and may take appropriate action as previously described above.

Referring now to FIGS. 2 and 5, in some examples, controller 70 may capture an image 82 (which again may comprise a series of images) with the image sensor 60 showing that the first viewer 50 and the second viewer 52 are engaged in a conversation. Specifically, the controller 70, via the image sensor 60, may determine that the first viewer 50 is directing speech at the second viewer 52 and/or that the second viewer 52 is directing speech at the first viewer 50. Without being limited to this or any other theory, if the first viewer 50 engages in a conversation with the second viewer 52 for some period of time (e.g., greater than some threshold time), and has not taken further action to hide or occlude the display panel 18 from the second viewer 52 (e.g., such that the image sensor 60 would no longer detect the presence of the second viewer 52), then controller 70 may determine that the first viewer implicitly approves of the second viewer 52 seeing the information 40 presented on display panel 18. As a result, the controller 70 may determine, based on the detected conversation, that the second viewer 52 is authorized to view the information 40 presented on display panel 18. As mentioned above, in some examples the controller 70 may determine whether the conversation between the first viewer 50 and the second viewer 52 lasts more than a threshold period of time (e.g., 30 seconds, 1 minute, 2 minutes, etc.) before determining that the conversation provides implicit authority to the second viewer 52 to view the information 40.

The controller 70 may detect the conversation between the first viewer 50 and second viewer 52 by tracking the gaze direction of the eyes 51, 53 of viewers 50, 52. Specifically, controller 70 may determine, via the image 82 captured by the image sensor 60, whether the gaze of the eyes 51 of first viewer 50 are directed toward the second viewer 52 and whether the gaze of the eyes 53 of second viewer 52 are directed toward the first viewer 50 over some period of time. In some examples, the gaze of the viewers 50, 52 may be determined by the controller 70 based on an analysis of the facial features (or facial landmarks) of the viewers 50, 52. Specifically, controller 70 may analyze the image 82 obtained by the image sensor 60 to determine the relative positions of each viewer's 50, 52 respective eyes 51, 53, nose 58, 59, mouth 55, 57, etc., and based on these relative positions, make a determination as to the likely direction that the viewers 50, 52 are facing. For instance, controller 70 may assume that if the facial features (e.g., eyes, nose, mouth) of a particular viewer (e.g., viewer 50, 52) are relatively symmetric, then that particular viewer is generally facing directly into the image sensor 60. However, when a viewer (e.g., viewers 50, 52) turns his or her head away from the image sensor 60, the image sensor's 60 view of the viewer's facial features also changes (e.g., some facial features are no longer symmetrical or are hidden from view entirely). By analyzing the relative positions of a viewer's facial features, the controller 70 may determine what direction that viewer is looking.

It is natural that two people engaging in conversation do not look directly at one another simultaneously during the entire course of the conversation. As a result, controller 70 may determine whether the gaze of the viewers 50, 52 is directed toward one another (e.g., simultaneously, at different times, etc.) over some portion of the period of time (e.g., such as during the threshold period of time previously described above). In addition, controller 70 may also determine, via the image sensor 60, whether the mouths 55, 57 of viewers 50, 52, respectively, are also moving during the period of time, which would indicate that speech is being produced by the viewer 50 and/or the viewer 52. Taken together, if over the period of time, the controller 70 detects (e.g., using the image sensor 60) that viewers 50, 52 are generally directing their gaze toward one another (even if not simultaneously) and are producing speech, the controller 70 may determine that the viewers 50, 52 are engaged in a conversation, which may provide implicitly authority to the second viewer 52 to view the information 40 as previously described.

In some examples, the controller 70 may also use the microphone 62 (see e.g., FIG. 3) to capture the voices of the viewers 50, 52 over the period of time to further determine whether a conversation is taking place between the viewers 50, 52. In addition, in some examples, the controller 70 may further use the image sensor 60 (and possibly also the microphone 62 in FIG. 3) to determine whether the conversation between the viewers 50, 52 is friendly or unfriendly. For instance, the controller 70 may analyze the image 82 obtained by the image sensor 60 to determine whether the eye shape, mouth shape, etc. indicate anger in either of the viewers 50, 52, and/or may analyze recordings obtained from the microphone 62 for volume and tone of the voices of the viewers 50, 52 that might indicate anger. As a result, in some examples, controller 70 may determine whether the conversation between the viewers 50, 52 is friendly or unfriendly. If the controller 70 determines that the conversation between the viewers 50, 52 is friendly, then the controller 70 may determine that the second viewer 52 is authorized to view the information 40 presented on display panel 18. If, on the other hand, controller 70 determines that the conversation between the viewers 50, 52 is not friendly, then the controller 70 may determine that the second viewer 52 is not authorized to view the information 40 presented on display panel 18.

In some circumstances, an interaction between the viewers 50, 52 may indicate that the second viewer 52 is behaving evasively, which would tend to indicate that he or she is not authorized to view the information 40 presented on display panel 18, and is in fact attempting to view the information 40 while avoiding detection. For instance, reference is now made to FIGS. 6-8, which show a sequential series of images 84, 86, 88 captured by the image sensor 60 that the controller 70 may interpret as an interaction indicating that the second viewer 52 is not authorized to view the information 40. As was previously described above for images 80, 82 in FIGS. 4, 5, respectively, the images 84, 86, 88, may each comprise a series of images.

Figure 6:
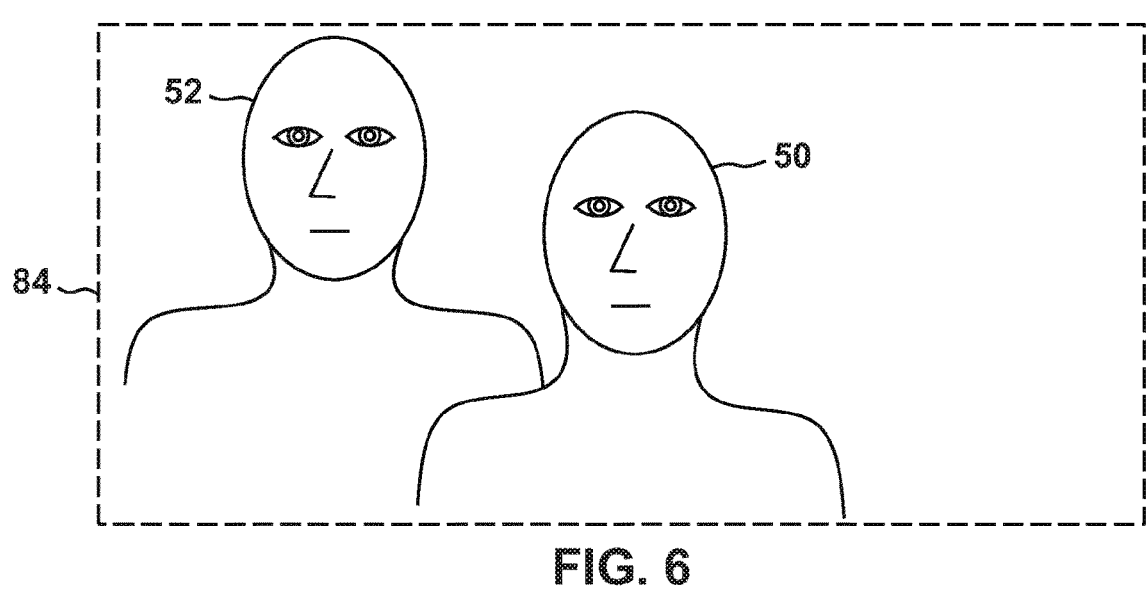
Figure 7:
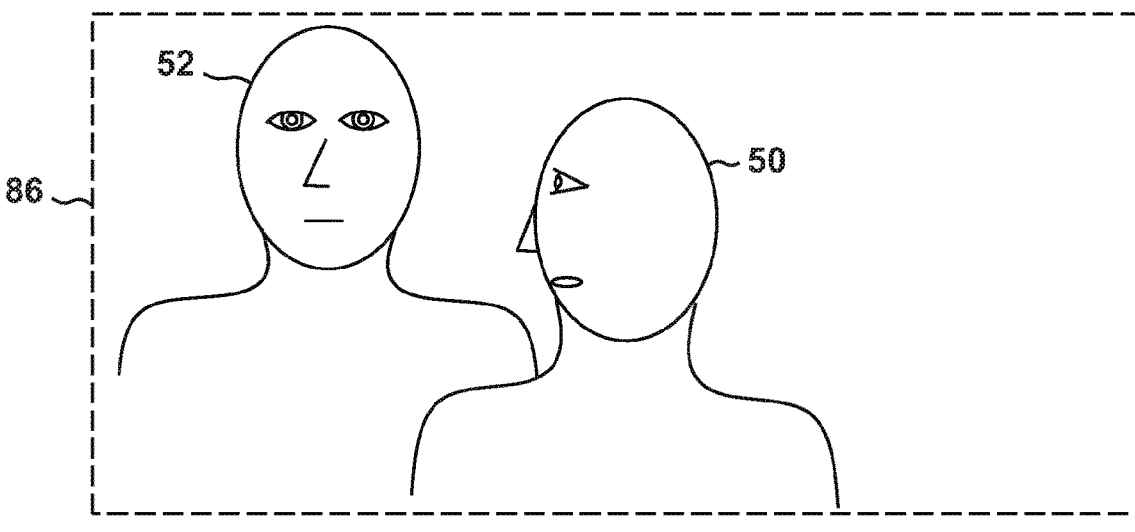
Figure 8:
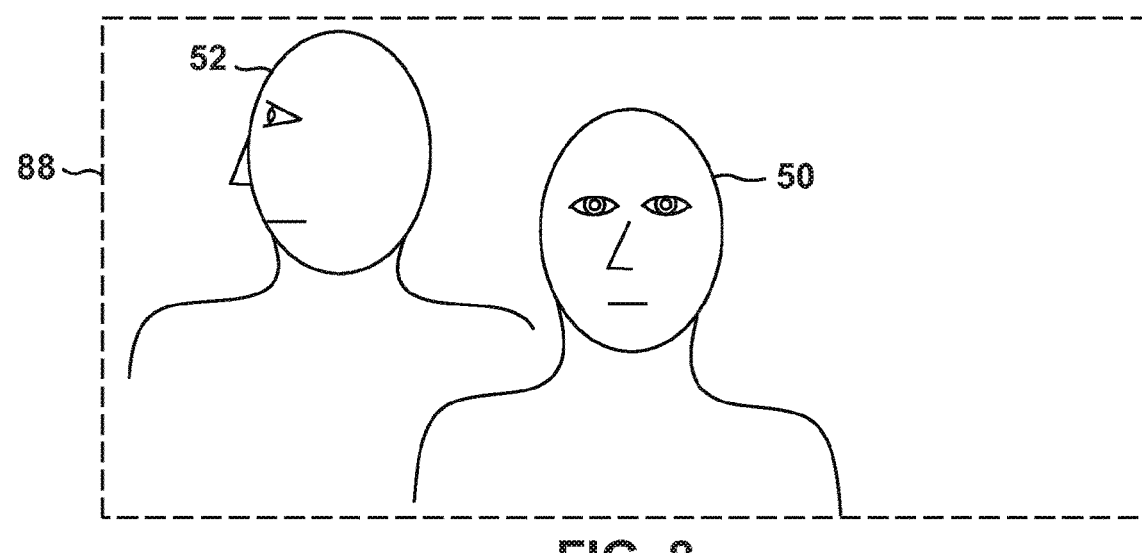

First, FIG. 6 shows an image 84 captured by the image sensor 60 that indicates that a second viewer 52 is positioned over the shoulder of the first viewer 50 and is directing his gaze toward the display panel 18. Next, in FIG. 7, the image sensor 60 subsequently captures another image 86, showing that the first viewer 50 has turned his gaze toward the second viewer 52. Finally, FIG. 8 shows a third image 88 captured by the image sensor 60, showing that following the visual engagement of the second viewer 52 by the first viewer 50 per image 86 in FIG. 7, the second viewer 52 looks away from the display panel 18.

This sudden change in the gaze of the second viewer 52 following visual engagement by the first viewer 50 may tend to indicate that the second viewer 52 does not wish to be seen viewing the information 40 on display panel 18, and is therefore behaving evasively to avoid detection. Regardless as to whether the evasive behavior of the second viewer 52 is innocent or nefarious (e.g., the second viewer 52 may have simply allowed his gaze to innocently wander toward the display panel 18 while lost in thought), controller 70, upon analyzing the series of images 84, 86, 88 in FIGS. 6-8 may nevertheless determine that the second viewer 52 is not authorized to view the information 40 and may then, in response, take appropriate action(s) as previously described above. While analyzing the images 84, 86, 88, the controller 70 may utilize any of the techniques previously described above to determine the gaze direction of the first viewer 50 and second viewer 52.

Figure 9:
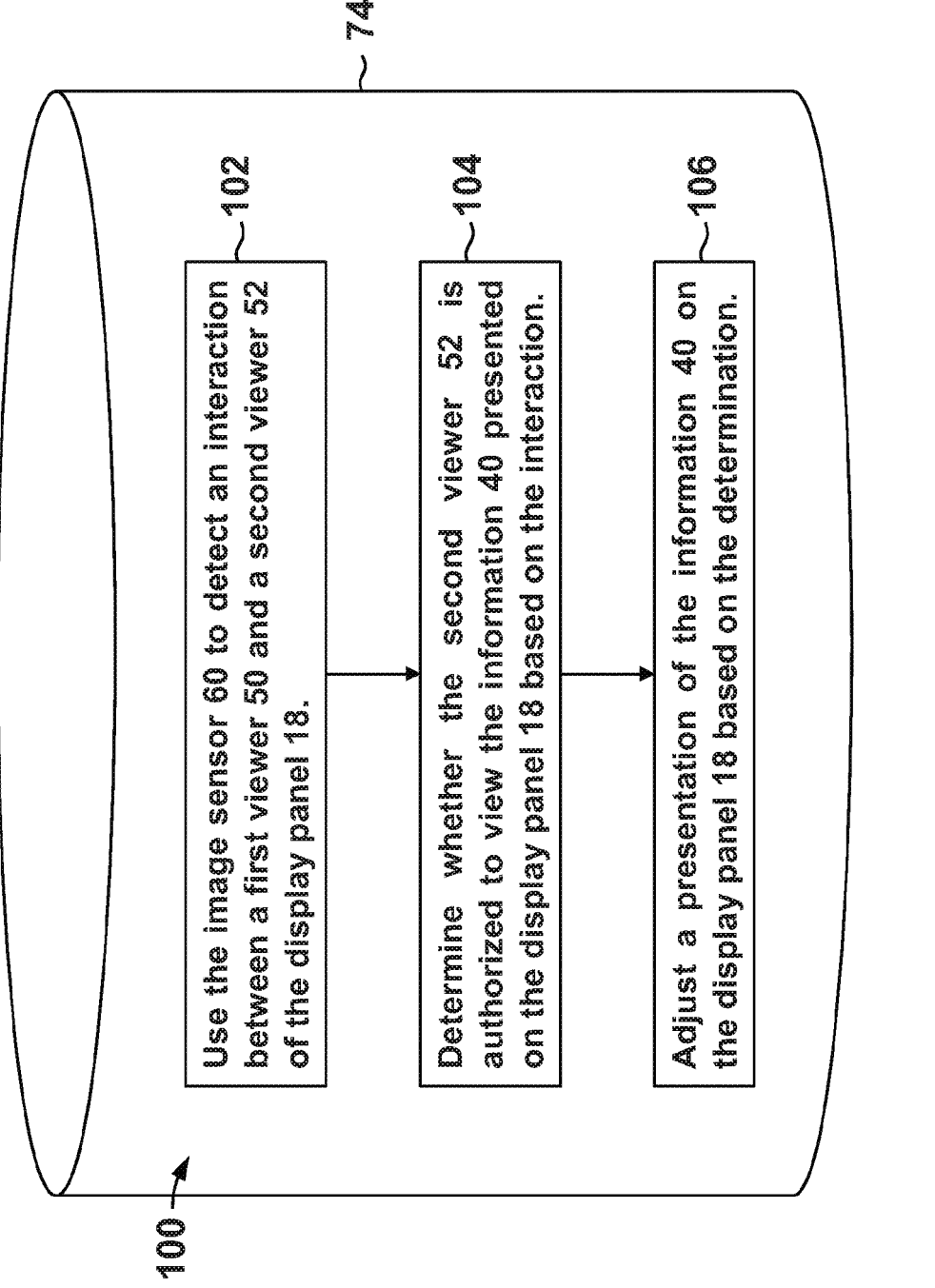

FIGS. 9-11 show example machine-readable instructions 100, 200, 300 that may be performed by controller 70 to determine whether the second viewer 52 is authorized to view the information 40 presented on display panel 18. In some examples, the machine-readable instructions 100, 200, 300 may be saved on memory 74 as an example of machine-readable instructions 76 that may be executed by processor 72 (see e.g., FIG. 2). In describing the features of machine-readable instructions 100, 200, 300, continuing reference will be made to the schematic depiction of electronic device 10 in FIGS. 1 and 2, so as to provide clarity.

Referring to FIGS. 1, 2, and 9, machine-readable instructions 100 include using the image sensor 60 to detect an interaction between a first viewer 50 and a second viewer 52 of the display panel 18 at block 102. For instance, the interaction may comprise a movement of the first viewer 50 to clear a view of the display panel 18 for the second viewer 52 as previously described above (see e.g., FIG. 4), a conversation between the viewers 50, 52 (see e.g., FIG. 5), or any other interaction that may provide an indication as to whether the second viewer 52 is or is not authorized to view the information 40 (see e.g., FIGS. 6-8).

Machine-readable instructions 100 also include, at block 104, determining whether the second viewer 52 is authorized to view the information 40 presented on the display panel 18 based on the interaction. Specifically, in the manner previously described above, the controller 70 may determine whether the interaction between the viewers 50, 52 indicates that the second viewer 52 is authorized to view the information 40.

Further, machine-readable instructions 100 also include, at block 106, adjusting a presentation of the information 40 on the display panel 18 based on the determination. Specifically, if the controller 70 determines that the second viewer 52 is not authorized to view the information 40 on display panel 18, the controller 70 may then (e.g., directly or indirectly through another controller or suitable assembly), reduce a visibility of the information 40 on the display panel 18, provide a warning message to the first viewer 50, and/or take any other suitable action to protect the information 40 on the display panel 18 as previously described above. Conversely, if the controller 70 determines that the second viewer 52 is authorized to view the information 40 presented on the display panel 18, the controller 70 may increase a visibility of the information 40 on the display panel 18 for the second viewer 52 in the manner previously described above.

Referring to FIGS. 1, 2, and 10, machine-readable instructions 200 include, at block 202, detecting a first viewer 50 of a display panel 18 of an electronic device 10 and a second viewer 52 of the display panel 18 via an image sensor 60 coupled to the electronic device 10. In addition, machine-readable instructions 200 include, at block 204, determining whether the second viewer 52 is authorized to view information 40 presented on the display panel 18 based on an action of the first viewer 50 captured by the image sensor 60. For instance, as previously described above, actions by the first viewer 50 may indicate whether the second viewer 52 is authorized to view the information 40 on the display panel 18. Specifically, the first viewer 50 may shift position to clear a view of the display panel 18 for the second viewer 52 (see e.g., FIG. 4), or the first viewer 50 may direct speech toward the second viewer 52 over a period of time as part of a conversation between the first viewer 50 and the second viewer 52 (see e.g., FIG. 5). As a result, by analyzing actions of the first viewer 50, controller 70 may make a determination as to whether the second viewer 52 is authorized (e.g., at least implicitly) to view the information 40 presented on display panel 18.

Machine-readable instructions 200 also include, at block 206, adjusting a presentation of the information 40 presented on the display panel 18 based on the determination. The adjustments may be made to increase or reduce a visibility of the information 40 in the various manners previously described above, based on whether the controller 70 determines that the second viewer 52 is or is not, respectively, authorized to view the information 40.

In some examples, controller 70 may initially presume that the second viewer 52 is not authorized to view the information 40 presented on the display panel 18. In some examples, this initial presumption may be applied by the controller 70 when the controller 70 is either informed or determines that electronic device 10 is being operated in a public location in the manner generally described above. In these situations, after initially assuming that the second viewer 52 is not authorized, the controller 70 may then analyze an interaction between the second viewer 52 and the first viewer 50 and/or an action of the first viewer 50 and/or the second viewer 52 in the manner previously described above. As a result of this analysis, the controller 70 may then make a more formal determination as to whether the second viewer 52 is authorized to view the information 40. Without being limited to this or any other theory, by initially presuming that the second viewer 52 is not authorized to view the information 40, the controller 70 may take more immediate action to safeguard the information 40 (e.g., by reducing the visibility thereof as previously described above), until a more formal determination can be made based on an interaction between and/or actions of the viewers 50, 52 as previously described above.

For instance, referring to FIGS. 1, 2, and 11, machine-readable instructions 300 include, at block 302, using the image sensor 60 to detect a first viewer 50 of the display panel 18 and a second viewer 52 of the display panel 18, and then at block 304, reducing a visibility of information 40 presented on the display panel 18 for the second viewer 52 in response to the detection of the second viewer 52. Thus, upon detecting the second viewer 52, the controller 70 may presume that the second viewer 52 is not authorized and thus reduce a visibility of the information 40 in response to that detection so as to safeguard the information 40 until a more formal determination as to the authorization of the second viewer 52 (e.g., to view the information 40) can be made.

Next, machine-readable instructions 300 include using the image sensor 60 to detect an interaction between the first viewer 50 and the second viewer 52 at block 306. Then, at block 308, machine-readable instructions 300 include determining that the second viewer 52 is authorized to view the information 40 presented on the display panel 18 based on the interaction. Then, at block 310, machine-readable instructions 300 include increasing the visibility of the information 40 presented on the display panel 18 for the second viewer 52 in response to the determination. Accordingly, after initially assuming that the second viewer 52 is not authorized and thereby reducing a visibility of the information 40 at blocks 302, 304, the controller 70 may then detect an interaction between the first viewer 50 and second viewer 52 at block 306, determine that the second viewer 52 is authorized to view the information 40 at block 308, and finally may increase a visibility of the information 40 presented on the display panel 18 for the second viewer 52 as a result of the determination. In some examples, increasing the visibility of the information 40 presented on the display panel 18 at block 310 may include restoring the visibility of the information 40 that was previously reduced via block 304.

The examples disclosed herein include electronic devices (and/or components thereof) that may actively monitor an environment surrounding a first viewer (e.g., first viewer 50) of a display panel (or portion thereof) (e.g., display panel 18), and upon detecting a second viewer (e.g., second viewer 52), monitor for additional interaction between the first viewer and second viewer and/or an action of the first viewer and/or second viewer that might indicate that the second viewer is an authorized viewer of the information (e.g., information 40) presented on the display panel. Thereafter, the electronic device may take some action based on the determination as to whether the second viewer is authorized (e.g., to protect the information presented on the display panel or to enhance a visibility thereof). Thus, through use of the example electronic devices disclosed herein, privacy of information presented on a display panel may be preserved while allowing for collaborative viewing of the information when desired.

In the figures, certain features and components disclosed herein may be shown exaggerated in scale or in somewhat schematic form, and some details of certain elements may be omitted in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections.

As used herein, including in the claims, the word "or" is used in an inclusive manner. For example, "A or B" means any of the following: "A" alone, "B" alone, or both "A" and "B."

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
a display panel;
an image sensor; and
a controller coupled to the image sensor, wherein the controller is to:
    use the image sensor to detect a physical shift in position of a first viewer from a first position to a second position, the second position providing a clear view of the display panel to a second viewer;
    determine that the second viewer is authorized to view information presented on the display panel based on the physical shift in position of the first viewer; and
    adjust a presentation of the information on the display panel based on the determination.

2. The electronic device of claim 1, wherein the controller is to:
    use the image sensor to detect an interaction between the first viewer and the second viewer;
    determine that the interaction comprises a conversation between the first viewer and the second viewer over a period of time; and
    determine that the second viewer is authorized to view the information presented on the display panel in response to determining that the interaction comprises the conversation.

3. The electronic device of claim 1, wherein the controller is to use the image sensor to detect that the second viewer looks away from the display panel following a visual engagement of the second viewer by the first viewer, and in response, determine that the second viewer is not authorized to view the information presented on the display panel.

4. The electronic device of claim 1, comprising a microphone, wherein the controller is to adjust a detection range or direction of the microphone based on the determination.

5. A non-transitory, machine-readable medium, storing instructions, which, when executed by a processor of an electronic device, cause the processor to:
    detect a first viewer of a display panel of the electronic device and a second viewer of the display panel via an image sensor coupled to the electronic device;
    use the image sensor to determine that the first viewer and the second viewer are engaging in a conversation for a period of time;
    determine that the second viewer is authorized to view information presented on the display panel based on the period of time exceeding a threshold period of time; and
    adjust a presentation of the information presented on the display panel based on the determination.

6. The non-transitory, machine-readable medium of claim 5, wherein the instructions, when executed by the processor, cause the processor to:
    use the image sensor to determine that an action of the first viewer comprises a shift in position of the first viewer to clear a view of the display panel for the second viewer; and
    determine that the second viewer is authorized to view the information presented on the display panel based on the shift in position of the first viewer.

7. The non-transitory, machine-readable medium of claim 5, wherein the instructions, when executed by the processor, cause the processor to:
    use the image sensor to determine that an action of the first viewer comprises directing speech to the second viewer; and
    determine that the second viewer is authorized to view the information presented on the display panel based on the action.

8. The non-transitory, machine-readable medium of claim 5, wherein the instructions, when executed by the processor, cause the processor to adjust the presentation of the information on the display panel by moving information from a first region of the display panel to a second region of the display panel, wherein a view of the second region for the second viewer is not obstructed by the first viewer.

9. An electronic device, comprising:
a display panel;
an image sensor; and
a controller coupled to the display panel and the image sensor, wherein the controller is to:
    use the image sensor to detect a first viewer of the display panel and a second viewer of the display panel;
    reduce a visibility of information presented on the display panel for the second viewer in response to the detection of the second viewer;
    use the image sensor to detect an interaction between the first viewer and the second viewer, wherein the interaction between the first viewer and the second viewer includes at least one of a physical shift in position of the first viewer to clear a view of the second viewer of the display panel or a conversation between the first viewer and the second viewer that continues for at least a threshold period of time;
    determine that the second viewer is authorized to view the information presented on the display panel based on the interaction; and increase the visibility of the information presented on the display panel for the second viewer in response to the determination.

10. The electronic device of claim 9, wherein the controller is to reduce the visibility of the information presented on the display panel by moving the information from a first region of the display panel to a second region of the display panel, wherein a view of the second region for the second viewer is obstructed by the first viewer.

11. The electronic device of claim 9, wherein the controller is to reduce the visibility of the information presented on the display panel by altering a text size of the information.

12. The electronic device of claim 9, wherein the controller is to determine whether the second viewer is authorized to view the information presented on the display panel based on an action of the first viewer during the interaction, detected via the image sensor, that indicates authorization for the second viewer to view the information presented on the display panel.

13. The electronic device of claim 1, wherein the controller is to adjust the presentation of the information on the display panel by increasing a visibility of the information on the display panel for the second viewer in response to the determination that the second viewer is authorized to view the information presented on the display panel.

14. The electronic device of claim 13, wherein increasing the visibility of the information on the display panel for the second viewer comprises at least one of increasing a size of the information or moving the information to a location on the display panel that is more easily viewable by the second viewer.

15. The electronic device of claim 1, wherein the controller is to:

detect whether the information presented on the display panel includes confidential or sensitive content.

16. The electronic device of claim 1, wherein the controller is trained via a machine-learning training method to recognize certain images as confidential or sensitive, and is to detect whether the information presented includes the confidential or sensitive content based on the training.

17. The non-transitory, machine-readable medium of claim 7, wherein the instructions, when executed by the processor, cause the processor to:

use a microphone coupled to the electronic device to detect the speech directed by the first viewer to the second viewer; and determine that the second viewer is authorized to view the information presented on the display panel based on a determination that the speech is friendly.

18. The electronic device of claim 9, wherein the interaction includes friendly speech between the first viewer and the second viewer.

19. The electronic device of claim 9, wherein the controller is to use the image sensor to detect the interaction between the first viewer and the second viewer based on a sequential series of images captured by the image sensor.

20. The electronic device of claim 9, wherein the controller is to determine that the information presented on the display panel is confidential or sensitive.

* * * * *